United States Patent [19]

Yamada

[11] Patent Number: 4,470,074
[45] Date of Patent: Sep. 4, 1984

[54] METHOD OF SCANNING AND RECORDING IMAGES

[75] Inventor: Mitsuhiko Yamada, Kyoto, Japan

[73] Assignee: Dainippon Screen Mfg. Co., Ltd., Japan

[21] Appl. No.: 380,690

[22] Filed: May 21, 1982

[30] Foreign Application Priority Data

May 27, 1981 [JP] Japan .................................. 56-81564

[51] Int. Cl.³ .......................... H04N 1/38; H04N 1/40
[52] U.S. Cl. .................................... 358/287; 358/257; 358/302; 358/903
[58] Field of Search ............... 358/287, 280, 257, 302, 358/903; 364/523

[56] References Cited

U.S. PATENT DOCUMENTS 4,327,380 4/1982 Yamada ............................... 358/287
4,417,805 11/1983 Kishi .................................... 358/287

FOREIGN PATENT DOCUMENTS 56-31273 3/1981 Japan .
2062396 5/1981 United Kingdom .
2062397 5/1981 United Kingdom .
2063005 5/1981 United Kingdom .

Primary Examiner—Howard W. Britton
Attorney, Agent, or Firm—Brumbaugh, Graves, Donohue & Raymond

[57] ABSTRACT

A method of scanning and recording images is so designed that, when plural originals arranged on an original cylinder are recorded onto a film held on a recording cylinder, a device or devices of a color scanner can be controlled by data previously written in predetermined addresses of respective memories in both the horizontal directions and the vertical directions, based on various conditions such as color correction, sharpness emphasis and so on. The method comprises: reading out data in order from a memory depending on positional informations of reproduced images to be recorded, said data being previously written in said memory based in desired conditions; and controlling a device or devices incorporated in the apparatus, based on the read-out data.

5 Claims, 5 Drawing Figures

FIG. 2-(a)
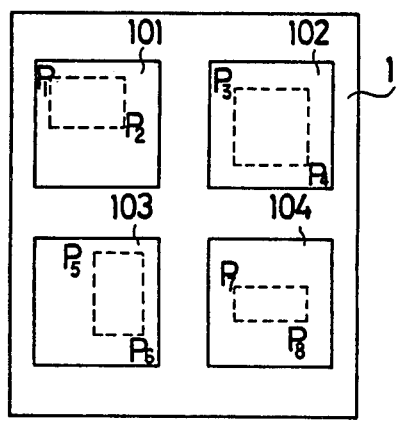
FIG. 2(b)
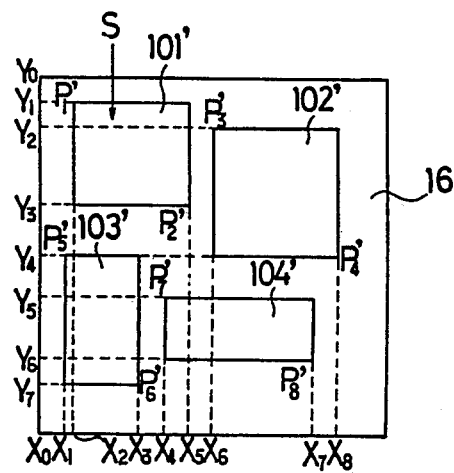

METHOD OF SCANNING AND RECORDING IMAGES

BACKGROUND OF INVENTION

This invention relates to a method of scanning and recording images, particularly to a method of control for scanning and recording plural images held on an original cylinder, reproducing the images at desired positions of a film held on a recording cylinder, corrected in color as desired, in a desired reproduction magnification and in a desired arrangement.

A prior apparatus has been provided that photoelectrically scans original images held on an original cylinder and reproduces images corresponding to the original images at a desired position of a film held on a recording cylinder, in a desired reproduction magnification and arrangement. Such apparatus is disclosed in U.S. application Ser. No. 179,697 filed Aug. 20, 1980, now U.S. Pat. No. 4,327,380, which was also filed by the present applicant. In accordance with the U.S. Pat. No. 4,327,380, such apparatus detects both the distance between a record-start point of a recording head and the present position thereof and the distance between a scanning-start point of a scanning head and the present position thereof, namely detects the positional deflection of both the heads at a certain point of time, setting a standard on the basis of the position of the recording head, then controls the moving rate of the scanning head adequately, based on the positional deflection and on the reproduction magnification of images to be reproduced, thus the record-start point of the recording head which corresponds to the scanning head is substantially aligned with the scanning-start point of the scanning head, whereby respective images to be reproduced is accurately positioned, particularly in the horizontal directions.

The present invention is to improve upon such controls as mentioned above of the prior apparatus when scanning and recording of images to be reproduced is made. That is, it is an object of the present invention to provide a method that more diverse controls than prior arts can be made in parallel, and moreover, such that the method can be practiced by a simple circuit construction. It is another object of the invention to provide a method that ensures fine and accurate reproducing results. Other features and objects of the invention can be readily understood, by way of a preffered embodiment, with reference to the accompanying drawings, in which:

FIG. 2(a) is a developed view of an original cylinder;

FIG. 2(b) is a developed view of a film held around a recording cylinder;

DETAILED DESCRIPTION OF INVENTION

Figure 1:
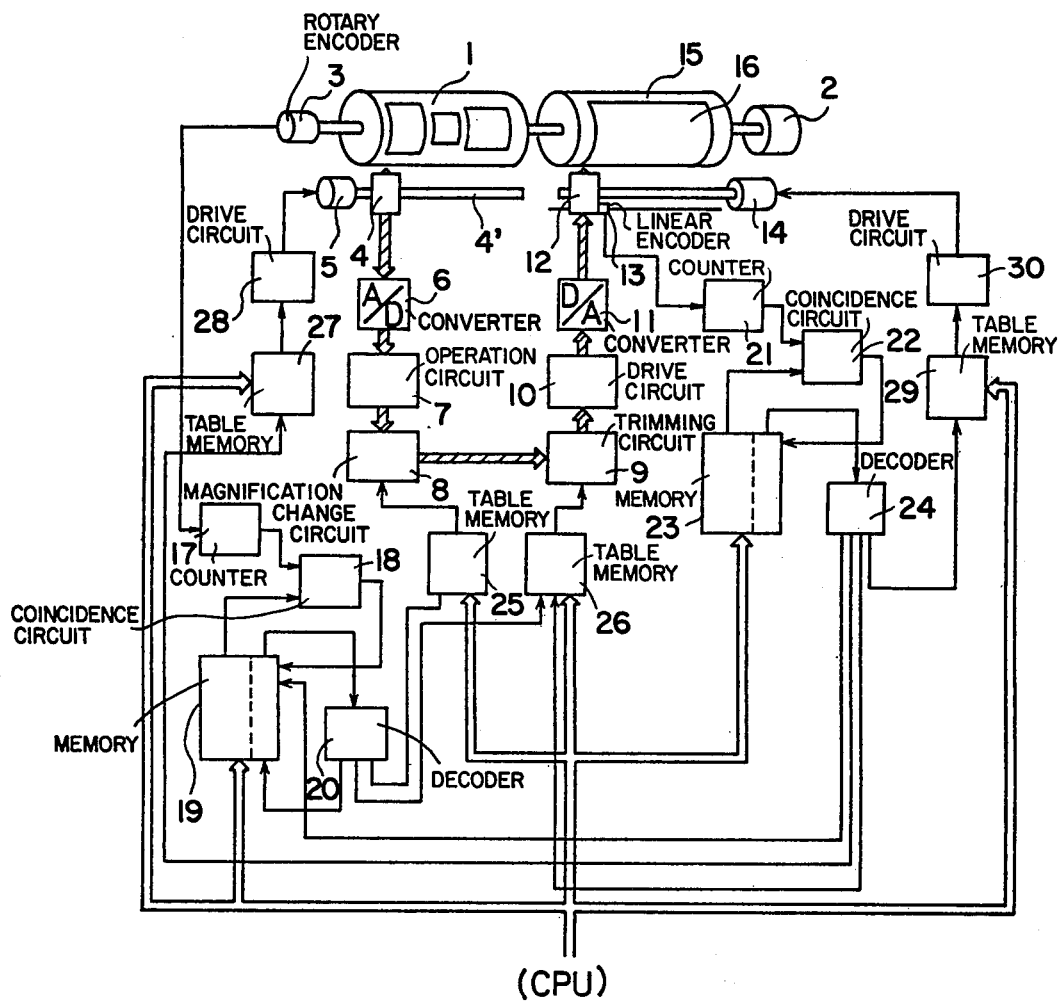
FIG. 1 is a block diagram of an apparatus for embodying the present invention.

Referring to FIG. 1 which shows a control system for embodying the present invention, both an original cylinder 1 and a recording cylinder 15 are rotated by a motor 2. Original images arranged on the surface of the cylinder 1 are scanned by a scanning head 4 which is arranged to face the images and is moved in the horizontal scanning directions, by a motor 5, on a screw rod 4' connected to the motor 5, then image signals obtained through the scanning head 4 are input via an analogue-to-digital (A/D) convertor 6 into an operation circuit 7 in scanning-line order. The operation circuit 7 is provided for various corrections to the signals, for example logarithmic compression, color correction and sharpness emphasis, as same as an operation circuit used for a conventional color scanners. The image signals output from the operation circuit 7, then, are input into a magnification change circuit 8. This circuit 8 is provided for reading out digitally converted image signals from a memory with repeated or skipped-out operations, based on desired reproduction magnifications, whereby the reproduction magnification in the vertical scanning directions can be changed. Of course, it may be applicable to use other magnification change systems for embodying the present invention. The image signals output from the circuit 8 are then input into a trimming circuit 9, which functions such as a gate circuit being controlled based on the position of the recording head 12, which is moved at a constant rate in the horizontal scanning directions, relative to the position of a film 16 held on the recording cylinder surface. Detailed explanation on the trimming circuit is provided later.

The image signals output from the trimming circuit 9 controls, via a drive circuit 10 and a digital-to-analogue (D/A) convertor 11, the recording head 12, thus images corresponding to the original images are reproduced on the film.

In order that the images corresponding to the desired areas of the originals arranged on the original cylinder 1 may be reproduced, in a desired magnification, at a desired positions of the film 16 held on the recording cylinder 15, operations are controlled, in the control system as shown in FIG. 1, as follows.

In case that, for example, desired areas of originals 101 to 104, which are shown in broken lines in FIG. 2(a), the originals being arranged on the original cylinder 1, are intended to reproduce at desired positions of the film 16, respective images being respectively in different magnifications as shown in FIG. 2(b), and simultaneously, to record a register mark at a desired position thereof, the control lines will consist of two lines, a horizontal scanning line and a vertical scanning line, in which the former is controlled, for example, by clock pulses generated from a rotary encoder 3 which is connected to a rotary shaft of the motor 2, and on the other hand, the latter is controlled, for example, by clock pulses generated from a linear encoder 13 mounted to the recording head 12.

The operations in the horizontal scanning directions are controlled as follows. In respective addresses of a memory 23, distances between a base position $X_0$, of the horizontal scanning directions, and respective points which respectively corresponds to a desired reproduced images 101' to 104', namely $X_0$ to $X_2$, $X_0$ to $X_5$, $X_0$ to $X_6$, $X_0$ to $X_8$, $X_0$ to $X_1$, $X_0$ to $X_3$, $X_0$ to $X_4$, $X_0$ to $X_7$, are respectively written, as pulse numbers respectively corresponding to the clock pulses generated from the linear encoder 13, into respective addresses of the memory 23, from the first address thereof in order. A device code is also written in the respective addresses, which the device code instructs what device or devices shown in FIG. 1 should be selected. The number of clock pulses integrated by a counter 21, the clock pulses being generated from the linear encoder 13, is compared, by a coincidence circuit 22, with the pulse number written in an address of the memory 23, then, when both the numbers agree, a coincident signal is generated, whereby the device code is read out from the corresponding address of the memory 23, and simultaneously address is advanced by one. Then, the device code is decoded by a decoder 24, and, for example, a table memory 27 is selected and operated.

A command code is previously written in table memories 25, 26, 27 and 29, the command code instructing how respective devices connected thereto is controlled. For example, an instruction is written in the first address of the memory 27, the instruction instructing to control the rotation rate of the motor 5 in order that the scanning head 4 may be moved from a position facing the original cylinder 1 to a position $P_1$ of the desired area of the original 101, shown in FIG. 2(a), exactly corresponding to the movement of the recording head 12 from the base point $X_0$ to the desired point $P_1'$ of the film 16, shown in FIG. 2(b), whereby the drive circuit 28 is operated based on the command code. Such control is disclosed in the U.S. Pat. No. 4,327,380 in detail. Then, the clock pulse corresponding to the point $X_2$ of the film 16 is integrated by the counter 21, whereby a device code is read out from the second address of the memory 23, then table memories 26, 27 are operated. A command code read out from the table memory 26, said code instructing to control the trimming circuit 9 in order to output only an image signal corresponding to the distance between the point $X_2$ to $X_5$ of the film 16, shown in FIG. 2(b). The output from the trimming circuit 9 is controllable, even in the vertical scanning directions, by the clock pulses from the rotary encoder 3. Such control also disclosed in the U.S. Pat. No. 4,327,380 in detail. On the other hand, simultaneously with the reading from the table memory 26, a command code is read out from the second address of the table memory 27, the command code instructing to control the motor 5 in order to move the scanning head 4 at an adequate rate corresponding to the magnification for the original 101, during the scanning head 4 scans the desired area of the original 101 corresponding to the area of the film 16, $X_2$ to $X_5$, shown in FIG. 2(b).

In the same manner as above, operations to the next original 102 are made in order, and, when the pulse number corresponding to the point $X_8$ which includes the point $P_4'$ of the film 16, shown in FIG. 2(b), is integrated by the counter 21, a device code is read out, from a predetermined address of the memory 23, whereby table memories 27, 29 are respectively operated via the decoder 24. Then, drive circuits 28, 30 are respectively controlled to rotate respective motors 5, 14 in reverse, thus both the scanning head 4 and the recording head 12 are respectively returned to the initial positions.

In case that the arrangement of the originals is in such a manner as shown in FIG. 2(a), it is necessary to return both the heads as mentioned hereinbefore. However, when originals are arranged in a row in the horizontal scanning directions, in such a manner as shown in FIG. 1, it is no need to return the heads.

Thus, in case of the former, operations in the horizontal scanning directions are controlled in the same manner as mentioned above.

On the other hand, operations in the vertical scanning directions are controlled by clock pulses generated from the rotary encoder 3, and the detailed explanation on such control is provided hereinafter.

The clock pulses generated from the rotary encoder 3 are integrated by a counter 17, then the integrated number is compared, by a coincidence circuit 18, with a pulse number previously written in a predetermined address of a memory 19, then, when both the numbers agree, a coincident signal is generated, whereby a device code is read out from a predetermined address of the memory 19, then the device code is input into a decoder 20. The memory 19 is, different from the memory 23, comprised of plural series of shift registers depending on the arrangement of the originals to be reproduced and on the magnification. The memory 19 is arranged so that a series of shift registers predetermined may be selected based on a device code output from the memory 23, the device code being output in response to the clock pulses from the linear encoder 13.

Figure 3:
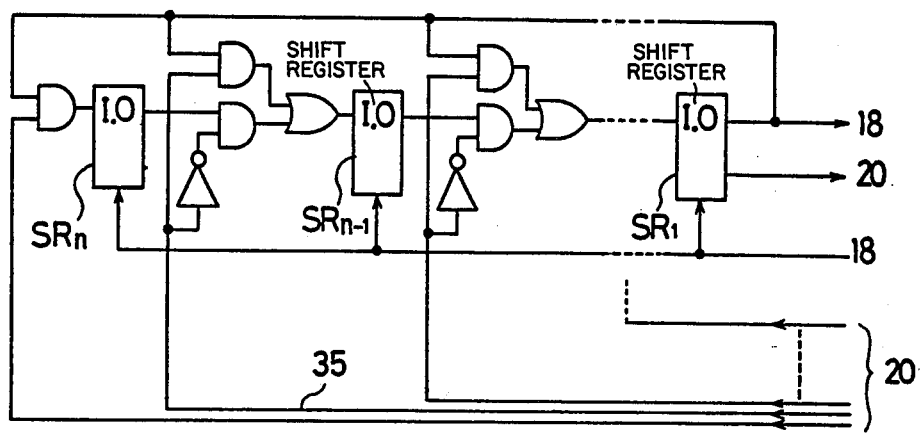
FIG. 3 is a circuit diagram of a shift register incorporated in a memory 19, shown in FIG. 1, which includes plural shift registers therein.

Referring to FIG. 3 which shows a series of shift registers, the pulse number corresponding to a base point $Y_0$ in the vertical scanning directions is written in a shift register $SR_1$, together with a device code which operates the trimming circuit 9. Then, the pulse number corresponding to a point $Y_1$ is written in a shift register $SR_2$ (not shown), together with a device code which operates the magnification change circuit 8 and with a device code which operates the trimming circuit 9. Then, the pulse number corresponding to a point $Y_3$ is written in a shift register $SR_{n-1}$, together with a device code which operates the trimming circuit 9. A register code, which instructs what a shift register or registers be used, is also written in the respective shift registers $SR_1$ to $SR_{n-1}$, in order that said codes and said pulse numbers written in the shift registers $SR_1$ to $SR_{n-1}$ may be repeatedly read out during movement of the recording head 12, for example when the reproduction on a line shown by an arrow S in FIG. 2(b) is intended, from a point $X_2$ to $X_3$ in the horizontal directions. Thus, when the recording head 12 is reached to the base point $Y_0$ on the vertical directions of the film 16, a shift pulse is provided from the coincidence circuit 18 to the respective shift registers $SR_1$ to $SR_n$. Then, data written in the respective shift registers $SR_2$ to $SR_{n-1}$ are respectively shifted, for example data written in a shift register $SR_3$ is shifted to a shift register $SR_2$ and data written in the shift register $SR_2$ to a shift register $SR_1$, and simultaneously a register code, together with a device code, is read out from the shift register $SR_1$, whereby the register code is decoded by a decoder 20. Thus, a high-level signal is output from the decoder 20 to a line 35, then the data corresponding to the pulse number of the base position $Y_0$, written in the shift register $SR_1$, is shifted to a shift register $SR_{n-1}$, and simultaneously the device code read out from the shift register $SR_1$ is input into the decoder 20, whereby a table memory for operating the trimming circuit 9 is operated.

When the recording head 12 is reached to a point $Y_1$ on the film 16, in the same manner as above, a shift pulse is input into the respective shift registers $SR_1$ to $SR_n$, then the data written in the respective shift registers $SR_2$ to $SR_{n-1}$ are respectively shifted in the same manner as above, and simultaneously the data corresponding to the pulse number of a point $Y_1$, written in the shift register $SR_1$, is shifted to a shift register $SR_{n-1}$, whereby both table memories 25, 26 which respectively operates the magnification change circuit 8 and the trimming circuit 9 are operated by an output from the decoder 20.

A command code, which instructs how both the magnification change circuit 8 and the trimming circuit 9 are respectively controlled, is previously written in respective addresses of both the table memories 25, 26, depending on the scanning order for originals and on the arrangement of images to be recorded. For example, respective magnifications, respectively corresponding to the originals 101 to 104, the magnifications being set in the magnification change circuit 8, are written in order in the respective addresses of the table memory 25, and both the points $Y_0, Y_1, Y_2, \ldots, Y_7$ and the command codes corresponding to said points are written in the respective addresses of the table memory 26 in order to read out repeatedly the both.

It is applicable to use a trimming circuit controllable by clock pulses in both the horizontal directions and the vertical directions, as disclosed in the U.S. Pat. No. 4,327,380 in detail. However, it may be desirable to use a gate circuit controllable by a command code from the table memory 26, for example by either a high-level signal or a low-level signal. In this case, the command codes written in the table memory 26 may be provided from such a series of registers, as shown in FIG. 3, because the command codes are repeatedly read out as mentioned above.

In the explanation on the record in the vertical directions, control system is initially provided. In an embodiment shown in FIG. 1, a memory corresponding to at least scanning lines is included in the operation circuit 7, and said memory is comprised so that the scanning head 4 may precede the recording head 12 by at least one line to scan originals, which is controlled by the control system in the horizontal scanning directions.

It is desirable that the data to be written in the memories 19, 23 and the table memories 25, 26, 27 and 29 are previously written in them, with regard to all conditions, based on a control signal from a central processing unit (CPU), because the addresses in which the data written are variable depending on how plural originals arranged on the original cylinder are scanned or how reproduced images are arranged on a film held on the recording cylinder, or what magnification is selected for reproduction.

A register mark can be recorded on the film 16, by controlling the trimming circuit 9 to be either ON or OFF at a predetermined position in both the horizontal directions and the vertical directions.

Figure 4:
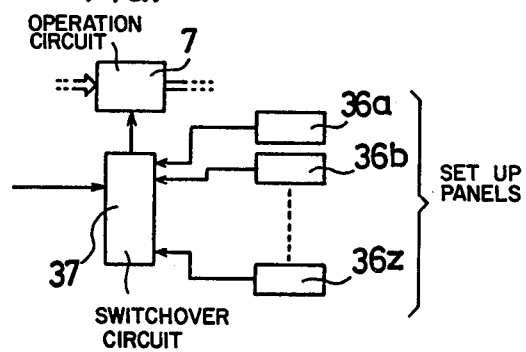
FIG. 4 is a block diagram of a circuit for varying reproduction conditions.

According to the present invention, other reproduction conditions, such as sharpness emphasis, degree of under color removal, highlight and shadow densities, gradation control and color correction, can be easily controlled and varied on the desired areas of the reproduced images. For example, referring to FIG. 4, various reproduction conditions are respectively preset in set-up panels 36a, 36b, ..., 36z, then a set-up panel or panels is or are selected by a switchover circuit 37, based on a command code, output from a table memory (not shown) which is operated in response to a device code read out from the memory 23, whereby desired conditions can be set in the operation circuit 7, hence the conditions can be controlled and varied.

In short, the present invention is so designed that, when plural originals arranged on an original cylinder are recorded onto a film held on a recording cylinder, a device or devices of a color scanner can be controlled by data previously written in predetermined addresses of respective memories in both the horizontal directions and the vertical directions, based on various conditions such as color correction, sharpness emphasis and so on, as well as recording positions, forms and magnifications of reproduced images, and moreover such control can be done with ease and with precision.

It is not necessary to particularly provide table memories 25, 26, 27 and 29, when a device code is written, together with a command code, in both the memory 23 and the respective shift registers which comprise the memory 19.

The present invention is also applicable in case that both an original cylinder and a recording cylinder are rotated, in the same direction, by separate motors respectively connected to rotary shaft of the respective cylinders.

The present invention also applicable in case that a plane scanning system, not a cylinder scanning system as shown in FIG. 1, is adopted to at least one side either a scanning side or a recording side.

What is claimed is:

1. A method of scanning and recording images including photo-electrically scanning plural original images in order by a scanning head facing said original images, said original images being arranged in a scanning side of a reproduction apparatus, by which image signals are obtained; and recording reproduced images corresponding to said original images onto a film which is held in a recording side of the apparatus, said method comprising:
    reading out data in order from memory means depending on positional informations of reproduced images to be recorded, said data being previously written in said means based on arrangement, forms and magnification of the reproduced images and reproduction conditions; and
    controlling a device or devices incorporated in the apparatus, based on the read-out data, whereby reproduced images are recorded in desired arrangement, forms and magnification and in desired reproduction conditions.

2. A method according to claim 1, wherein plural set-up panels are respectively changed over, depending on data read out from the memory means, various reproduction conditions being previously and respectively set in said respective panels, whereby reproduction conditions are controlled to input respectively into an operation circuit incorporated in the apparatus.

3. A method according to claim 1, wherein a reproduction magnification is controlled based on data read out from the memory means, said magnification being set in a magnification change circuit.

4. A method according to claim 1, wherein an output from a trimming circuit is controlled, depending on data read out from the memory means.

5. A method according to claim 1, wherein a drive circuit for operating motors which are respectively move a scanning head and a recording head is controlled depending on data read out from the memory means, so that both moving rate and moving direction of either one of said heads, in the horizontal directions, be changed.

* * * * *